Jan. 16, 1940. S. KALTOFT 2,187,380
PLOW
Filed Jan. 9, 1939 2 Sheets-Sheet 1

Inventor
Sigurd Kaltoft
By Lyon & Lyon
Attorneys

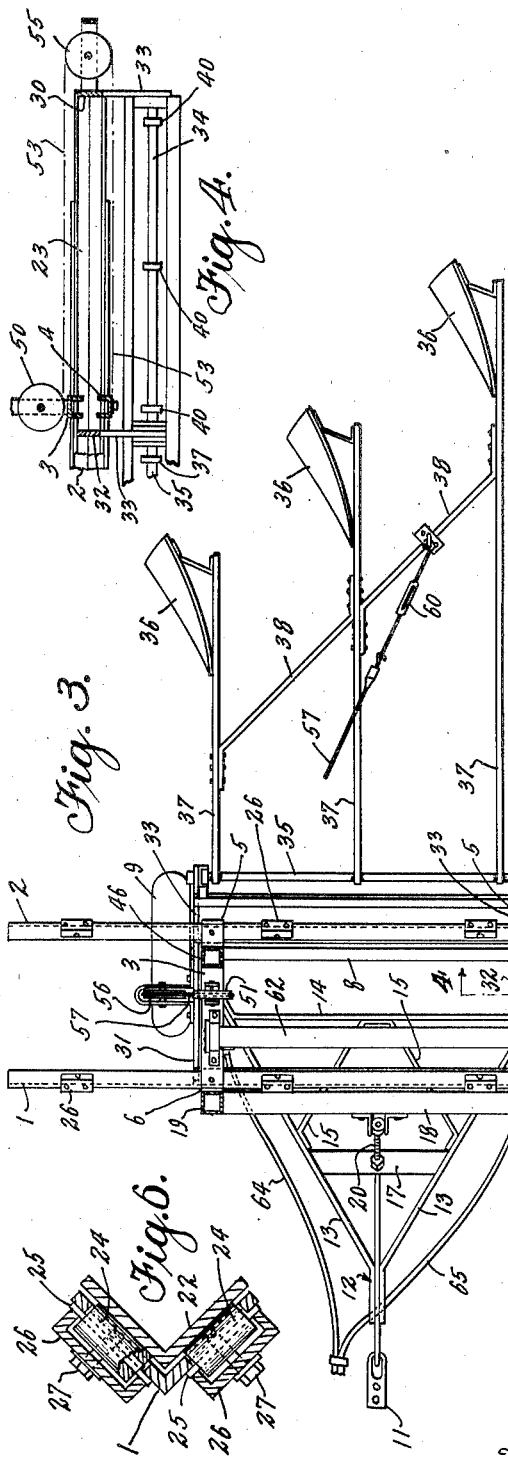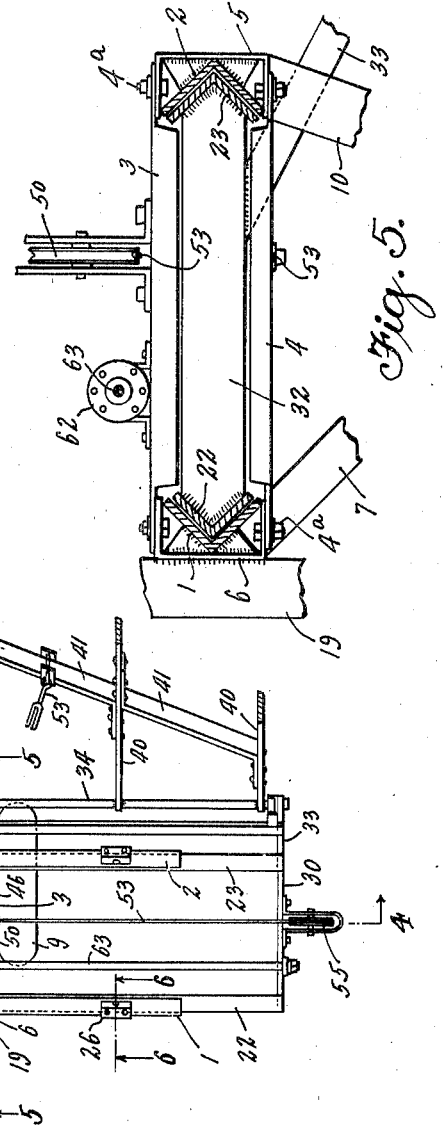

Patented Jan. 16, 1940

2,187,380

UNITED STATES PATENT OFFICE 2,187,380

PLOW

Sigurd Kaltoft, Hemet, Calif., assignor to Howard Rose Company, Hemet, Calif., a corporation of California Application January 9, 1939, Serial No. 249,925

9 Claims. (Cl. 97—29)

This invention relates to earth-working implements, and particularly to plows of the two-way type having two sets of plows laterally disposed with respect to each other, and selectively operable to turn furrows in either direction, so that it can be operated back and forth across a field, and take a furrow slice, or slices, at the same end of the unplowed area during each traverse of the field. The invention is particularly useful in two-way wheeled plows drawn by tractors.

A general object of the invention is to provide a simple, reliable, and easily controlled mechanism for selectively lowering and raising each of the two sets of tools of a dual-purpose implement into and out of operative position with the ground, and simultaneously shifting the tool laterally to center the active tools with respect to the line of draft, and eliminate side-pull.

Another object is to provide a power controlled two-way plow that can be turned in a small space.

A feature of the invention is a two-way power controlled plow having a wheeled chassis adapted to ride entirely on the unplowed land, with right and left plow gangs spaced laterally from each other and movable laterally as a unit with respect to the chassis to bring either gang into alignment with the chassis, and having a mechanism for simultaneously lowering the aligned gang into plowing position and raising the other gang out of plowing position.

Other more specific objects and features of the invention will be apparent from the detailed description to follow, of a specific embodiment of the invention illustrated in the drawings.

In the drawings:

Fig. 3 is a plan view of the plow in the same position;

Fig. 4 is a detail vertical section, taken approximately in the plane IV—IV of Fig. 3;

Fig. 5 is a detail vertical section, taken approximately in the plane V—V of Fig. 3; and Fig. 6 is a detail vertical section, taken approximately in the plane VI—VI of Fig. 3.

Figure 1:
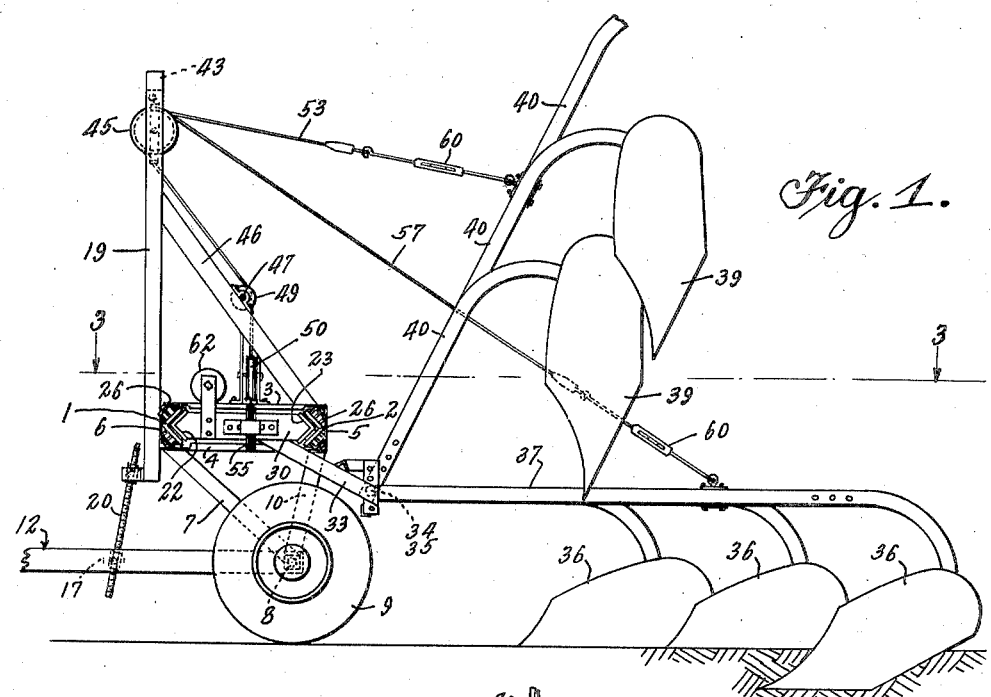
Fig. 1 is a side elevation view of a two-way gang plow in accordance with the invention.

Essentially, the plow described in the drawings is a two-way, two gang plow having a wheeled chassis adapted to be drawn by a tractor, or the like, with a mechanism so connecting the two gangs to the chassis as to permit lateral shifting of the gangs as a unit to bring either gang substantially directly back of the chassis and in the line of draft, and simultaneously lowering the gang that is in the line of draft into plowing position and raising the other gang out of plowing position.

The chassis proper comprises a pair of laterally extending V-bars 1 and 2, respectively, positioned one in advance of the other with their open sides facing each other, the two being connected in rigid relation. Thus referring to Figs. 3 and 5, the V-bars 1 and 2 are interconnected at two laterally spaced apart points thereon by upper and lower cross members 3 and 4, respectively. Each of the bars 3 and 4 may consist of a length of channel section steel having its side walls cut away adjacent the end, and having its web bolted as by bolts 4ª to side walls of short horizontally extending channel members 5 and 6, respectively, which are positioned outside of the V-bars 2 and 1, respectively, and joined thereto as by welding.

There is one of the channel members 6 at the forward end and one of the channel members 5 at the rear end of each of the bridging members 3 (both the members 3 appearing in Fig. 3), and each of the members 6 is connected by a downwardly and rearwardly extending member 7 (Fig. 1) to a solid axle 8 on the ends of which are mounted two supporting wheels 9. Similarly a member 10 extends downwardly and forwardly from each of the channel members 5 to the axle 8, so that the V-bar members 1 and 2 are rigidly connected to the axle 8.

The implement is drawn by a tractor or other source of power, which may be connected to a hitch 11 on the forward end of a drawbar 12, the latter comprising two rearwardly and outwardly extending members 13 which connect at their rear ends to the ends of the axle 8 closely adjacent the wheels 9. Reinforcing members 14 and 15 may be provided between the drawbar members 13.

Figure 2:
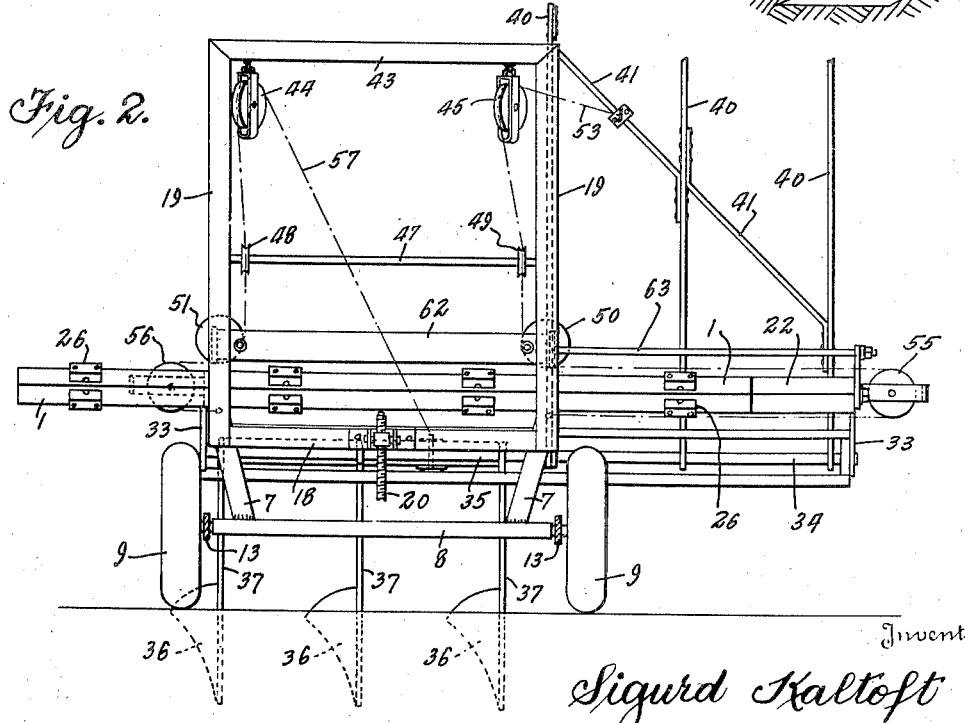
Fig. 2 is a front elevation view of the same plow in the same condition.

The rear ends of the drawbar members 13 are pivotally secured to the ends of the axle 8 and to maintain the axle 8 in desired position of orientation so as to maintain the V-bars 1 and 2 in substantially a horizontal plane, an adjustable connection is provided between the drawbar and the V-bar 1. Thus a plate 17 is provided extending between the drawbar members 13 in advance of the axle 8 and a cross member 18 is rigidly connected to and positioned below the V-bar 1 (Fig. 2). This member 18 is directly connected at its opposite ends to the lower ends of a pair of uprights 19 which extend vertically past and are secured to the channel members 6 (Fig. 5). Connection between the plate 17 on the drawbar and the cross member 18, is completed by a screw bar 20 so that by turning this screw bar 20 the distance between the plate 17 and the cross member 18, may be adjusted.

The two V-bars 1 and 2 constitute guides for supporting a laterally shiftable carriage, to which the plow gangs are connected. This carriage comprises a V-bar 22 nesting within the stationary V-bar 1 and a V-bar 23 nesting within the stationary V-bar 2. Direct contact between the stationary and movable V-bars is prevented by roller bearings 24 secured to the stationary bars 1 and 2 on their exterior surfaces, the rollers projecting through windows provided therefor in their associated stationary bars so that they bear against the exterior surfaces of the movable carriage V-bars 22 and 23.

Referring to Fig. 6, each of the rollers 24 is rotatably mounted on a shaft 25 which is clamped against the outer surface of the associated stationary bar 1 by channel members 26 bolted to the bolts 27 and the V-bar. The two movable V-bars 22 and 23 are rigidly connected together at their outer ends by bridging members 30 and 31, respectively, and at their midpoint by a bridging member 32; these members 30, 31 and 32 are welded to the V-bars in the particular construction shown. Secured to each of the bridging members 30, 31 and 32 is a downwardly and rearwardly extending member 33, all of which have their rear lower ends in alignment and rotatably support the ends of two cross bars 34 and 35, respectively, the bar 34 having connected thereto the left gang of plows and the bar 35 having connected thereto the right gang of plows. Each of the gangs of plows is rotatable with respect to the chassis about its associated bar 34 or 35 as an axis and receives its tractive force through the same bar. Thus the tractive force is supplied from drawbar 12 to the axle 8, from the axle 8 to the stationary V-bar members 1 and 2 through members 7 and 10, respectively, from the V-bar members 1 and 2 through the rollers 24 to the movable V-bars 22 and 23, from the movable V-bars through the bridging members 30, 31 and 32, to the three members 33 which support the bars 34 and 35.

The right gang of plows comprises three plows 36, 36, 36, each connected by a plow beam 37 to the bar 35, and the three plow beams 37, 37, 37 are interconnected by braces 38. The left gang comprises three plows 39, 39, 39 each connected by a plow beam 40 to the bar 34. These plow beams 40 are interconnected by braces 41 spaced from the cross bar 34.

As clearly shown, the plows 36 each turn a furrow to the right and are used simultaneously during a traverse of the field. The three plows 37 in the other gang are oppositely disposed with respect to the plows 36 so that they turn furrows to the left and are used simultaneously during traverse of the field in the opposite direction.

As shown in the drawing, the plows 36 are lowered into plowing position and are also positioned substantially directly behind the drawbar 12 and the plow chassis so that they are in the line of draft, whereas the plows 37 are shown in elevated position clear of the ground and are disposed to the left out of the line of draft of the implement. When it is desired to turn the furrows in the opposite direction, as when the plow is run in the reverse direction across the same end of the unplowed area, the plows 36 are elevated and shifted out of the line of draft and the plows 37 are simultaneously lowered into the ground and shifted laterally into the line of draft. The mechanism for performing this operation will next be described. It is apparent from the description of the stationary guide bars 1 and 2 and the movable guide bars 22 and 23 that the latter are slidable laterally with respect to the bars 1 and 2, and that the bars 34 and 35 and the plows move with the V-bars 22 and 23. However the means for effecting the vertical movement has not yet been described. It consists of an assembly of pulleys and cables with means for moving some of the pulleys in response to lateral movement of the carriage including the V-bars 22 and 23, to one side or the other, to simultaneously lift one of the plow gangs and lower the other.

Thus referring to Figs. 1 and 2, the upright members 19 on the forward end of the machine are interconnected at their upper ends by a cross member 43, from which are supported two swivel pulleys 44 and 45, respectively, positioned near opposite ends of the cross member 43. The upright members 19 are braced with a pair of diagonal braces 46 extending to the chassis of the machine, and there is mounted on a shaft 47, extending between these braces 46, a pair of guide pulleys 48 and 49, respectively. Substantially directly below each of the guide pulleys 49 there is mounted on each stationary cross member 3 (Figs. 2 and 5), guide pulleys 50 and 51, respectively. There is also provided on the left end of the movable carriage a pulley 55 and on the right end of the movable carriage a pulley 56.

There is secured to the brace 41 in the left gang of plows, one end of a cable 53 which extends therefrom over the pulley 45, thence over the pulley 49, thence under the pulley 50, and thence horizontally to the extreme left end of the horizontal carriage and over the pulley 55. From the pulley 55 this cable extends back horizontally and is secured to the stationary chassis frame. A second cable 57 has one end secured to the brace 38 on the right gang and extends therefrom over the pulley 44, past the pulley 48, under the pulley 51, around the pulley 56 and back to the stationary chassis frame, where it is secured.

With the plow in the position shown in the drawings, in which the carriage is moved into extreme left position, the length of the cable 53 between the pulley 45 and the left gang, has been shortened by the movement of the pulley 55 to the left, so that the gang has been lifted clear of the ground and out of the plowing relation. On the other hand, this same movement of the carriage to the left caused the pulley 56 to approach the pulley 51 so as to increase the length of cable 57 between the pulley 44 and the right gang, so that the latter has been lowered into plowing position. The exact elevation of the plow with respect to the ground may be adjusted by a turnbuckle 60 inserted in each of the cables.

The movable carriage may be shifted in various ways, but a particularly convenient way is to employ a hydraulic cylinder supplied with pressure fluid through a suitable valve system from a pump mounted on the tractor, which draws the implement. Thus there may be provided on the stationary chassis a hydraulic cylinder 62 which may be positioned above and supported at opposite ends on the two bridging members 3. The cylinder 62 contains a piston (not shown) connected to a piston rod 63 which extends through a packing gland in the left end of the cylinder, and is connected at its other end to the end plate 30 of the movable carriage. Fluid may be supplied under pressure to either end of the cylinder 62 through hose connections 64 and 65. In the position of the apparatus shown in the drawings, the piston 63 has been moved to the left by supplying pressure fluid to the right end of the cylinder 62 through the hose connection 64. To reverse the position of the carriage, pressure fluid is supplied to the left end of the cylinder through the hose connection 65, which moves the piston and the piston rod 63 to the right, causing the movable carriage and the plow gangs connected thereto, to the extreme right position in which the right gang is positioned to the right of the line of draft of the implement and the left gang is positioned in alignment with the line of draft. It will be clearly apparent that the movement of the carriage to the right will slacken the cable 53 and thereby lower the left gang into plowing position, and will, at the same time, take up on the cable 57 to lift the right gang out of plowing position.

Both the lateral sliding movement of the carriage and the lifting of one gang and the lowering of the other gang occur simultaneously in response to the application of pressure fluid to one end or the other of the cylinder 62.

It may even be desirable to temporarily support both gangs of plows clear of the ground, as while making the turn at the end of the field preliminarily to starting the next traverse of the field in the other direction. This may be readily done by selectively supplying pressure fluid to one end of the cylinder 62 only long enough to move the piston substantially to the midpoint of the cylinder, under which condition both plows are symmetrically disposed on each side of the center line of the chassis, and both are supported in the air clear of the ground and substantially half-way between the positions occupied by the two gangs, as shown in Fig. 1. With both gangs clear of the ground, the plow may be very readily manipulated at the turn and when it is in proper position the valve in the fluid supply lines may again be actuated to admit additional fluid to the cylinder 62 to move the piston clear to the end thereof and lower the desired gang of plows to the ground while lifting the other gang to a higher elevation.

When transporting the plow any substantial distance, it is desirable to swing both gangs of plows upwardly and forwardly so that the plow beams extend forwardly and upwardly from the bars 34 and 35 and lean against the upper cross member 43 of the frame. To move the plows into this position, one of the gangs is first raised to the position shown in Fig. 1 by means of the cylinder 62. In this position little additional effort is required to swing the gang forwardly against the frame 43, and the operator can do this manually. This introduces slack in the supporting cable 53, which is of no moment. The operator thereafter introduces fluid to the cylinder 62 at the proper end to shift the carriage into the opposed position. This movement of the carriage does not affect the gang that has been previously elevated, since it merely introduces additional slack in the cable associated with that gang. However it shortens the cable associated with the other gang to lift it into the elevated position shown in Fig. 1. The operator then manually pushes this gang of plows forwardly until it lies against the cross member 43. The operator then admits fluid to the cylinder 62 to center the piston and carriage and both gang plows which are secured thereto. After doing this, the operator may lash the gang plows firmly to the cross member 43 so that they cannot be dislodged to fall rearwardly away from the upright 43. With the plow in this condition, it may be transported safely at high speeds over relatively rough terrain.

Although the invention has been explained by describing in detail its application to a two-way gang plow, because this represents one of the important uses of the invention, it is to be understood that the principle may be employed to landworking or road-making implements other than plows, and the invention is to be limited only to the extent set forth in the appended claims.

I claim:

1. An implement of the type described, comprising a frame adapted to be moved along above the ground, said frame including laterally extending guide means, carriage means supported by said guide means for lateral movement with respect to said frame, a plurality of tools connected to said carriage means for lateral movement therewith, means for shifting said carriage means along said guide means to selectively, laterally position said tools with respect to said frame, means for selectively raising and lowering different ones of said tools, and means for actuating said raising and lowering means in response to movement of said carriage along said guide means.

2. An implement of the type described, comprising a frame having drawbar means in fixed lateral relation thereto, and defining a line of draft of said frame, said frame including laterally extending guide means, a carriage supported by said guide means for lateral movement with respect to said frame, a plurality of tools connected to said carriage means for lateral movement therewith and vertical movement with respect thereto, means for shifting said carriage means along said guide means to selectively bring different ones of said tools into said line of draft of said frame, and means responsive to said movement of said carriage for lowering the tools in the line of draft into ground-engaging relation and elevating the tools out of the line of draft away from the ground.

3. An implement of the type described, comprising a frame having drawbar means, said frame including a pair of juxtaposed V-channel members extending laterally thereof, carriage means comprising a pair of V-channel means nesting in said V-channel members on said frame for lateral movement with respect to said frame, a plurality of tools connected to said carriage means for lateral movement therewith, and means for shifting said carriage means along said guide means to selectively, laterally position said tools with respect to said frame.

4. An implement as described in claim 3, in which one of said sets of V-channel members has roller means thereon for rollably engaging the other V-channel members relatively movable with respect thereto.

5. An implement of the type described, comprising a frame adapted to be moved along above the ground, said frame including laterally extending guide means, carriage means supported by said guide means for lateral movement with respect to said frame, a plurality of tools connected to said carriage means for lateral movement therewith, and means for shifting said carriage means along said guide means to selectively, laterally position said tools with respect to said frame, said movable carriage member being substantially longer than said guide means.

6. An implement of the type described, comprising a frame adapted to be moved along above the ground, said frame including laterally extending guide means, carriage means supported by said guide means for lateral movement with respect to said frame, a plurality of tools connected to said carriage means for lateral movement therewith, means for shifting said carriage means along said guide means to selectively, laterally position said tools with respect to said frame, in which said means for shifting said carriage means comprises a hydraulic cylinder mounted on said frame, a piston within said cylinder, having a piston rod extending therefrom, and connected to said carriage means, with means for supplying pressure fluid to either end of said cylinder.

7. An implement of the type described, comprising a frame adapted to be drawn over the ground, and having a fixed line of draft, said frame including laterally extending guide means, carriage means supported in said guide means for lateral movement with respect to said frame, a pair of tools connected to said carriage means for lateral movement therewith and vertical movement with respect thereto, cable means for lifting said tools, means for shifting said carriage means laterally along said guide means to selectively laterally position either of said tools in said line of draft of said frame, and means responsive to the lateral movement of said carriage means for bringing one of said tools into the line of draft of said frame and for pulling the cable means connected to the other tool, whereby the latter is elevated out of operative relation with the ground.

8. An implement as described in claim 7, in which said cable means includes an independent cable and pulley mechanism for each of said tools, each independently operated by lateral movement of said carriage.

9. An implement as described in claim 7, in which said means for effecting lateral and vertical movement of said tools are so relatively proportioned that both tools are elevated clear of the ground when they are symmetrically laterally disposed on opposite sides of the line of draft.

SIGURD KALTOFT.